Mar. 20, 1923.
J. B. DAVIS.
DISPENSING PUMP.
FILED DEC. 3, 1920.
1,449,217.
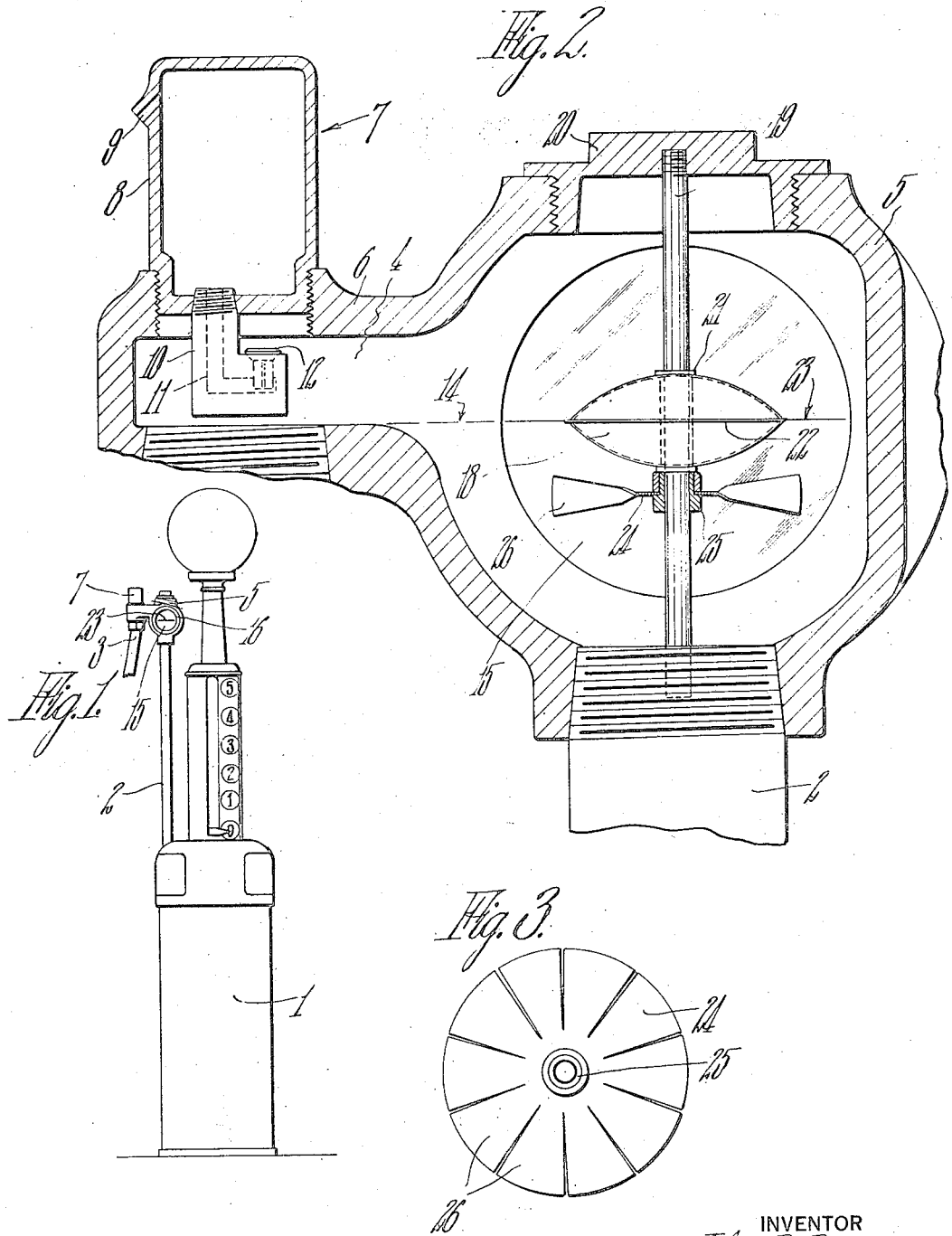

Patented Mar. 20, 1923.

1,449,217

UNITED STATES PATENT OFFICE.

JOHN B. DAVIS, OF SPRINGFIELD, MASSACHUSETTS, ASSIGNOR TO GILBERT & BARKER MANUFACTURING COMPANY, OF WEST SPRINGFIELD, MASSACHUSETTS, A CORPORATION OF MASSACHUSETTS.

DISPENSING PUMP.

Application filed December 3, 1920. Serial No. 428,108.

*To all whom it may concern:*

Be it known that I, JOHN B. DAVIS, a citizen of the United States, residing at Springfield, in the county of Hampden and State of Massachusetts, have invented new and useful Improvements in Dispensing Pumps, of which the following is a specification.

This invention relates generally to measuring pumps such as are commonly used for dispensing gasoline and like oils, and, more particularly, to improvements in pumps of this type designed to prevent deception of the customer by failure to deliver the exact quantity apparently measured.

One object of the invention is to provide means whereby the customer may ascertain at a glance whether the pump is properly primed before the pumping is commenced.

Another object of the invention is to provide means for indicating to the customer when the flow of liquid through the pump commences, and whether or not it is continued regularly without interruption as the liquid is being delivered.

Other objects and advantages of the invention relate to improved details of construction and features of operation as will be more fully set forth in the detailed description to follow,—

Fig. 1 is an elevational view of a measuring and dispensing pump embodying the invention;

Fig. 2 is an enlarged vertical sectional view illustrating the indicating mechanism in operative position relative to the discharge pipe; and Fig. 3 is an enlarged plan view of the vane wheel and the sliding bearing therefor.

In devices of this character it sometimes happens that the measuring pump is not fully primed, that is the level of the liquid falls below the level of the outlet by reason of leakage. This is most apt to occur when the pump has not been used for a considerable time, as, where the pump stands idle over night. When such a condition exists, the pump should first be primed, that is the pump should be operated to bring the liquid to the level of the outlet before the pump is operated through its measured stroke for delivering liquid to the customer.

In the embodiment of the invention illustrated herewith, 1 represents generally a measuring and dispensing pump and 2 its discharge pipe. The pump may be of any desired type and that shown is merely for illustrative purposes. For an understanding of the present invention, detailed description of the pump is unnecessary, but a full disclosure of the type of pump illustrated may be had, if desired, by reference to U. S. Letters Patent No. 1,302,014, granted April 29, 1919. The discharge pipe as illustrated takes the form of a pipe which extends upwardly above the top of the pump cylinder for a substantial distance, and this arrangement is generally desired, although not necessarily essential for all purposes. To the upper end of discharge pipe 2 is attached a flexible delivery hose 3, and a horizontal outlet passage 4 connects the delivery pipe 2 with the flexible hose.

For convenience in applying indicating devices of this character to the discharge pipe 2, a casing 5 is provided which may be screwed on, or otherwise secured to the upper end of the pipe 2. The casing 5 is provided with an elbow portion 6 within which the outlet passage 4 is formed, and to which are suitably secured an air-vent 7 and the delivery hose 3.

The air-vent may be of any desired construction, but in the present embodiment comprises a hollow casing 8 provided with a passage 9 communicating with the interior thereof through which air may be admitted freely to the interior of the casing. A valve holder 10 is suitably secured to the casing 8 and projects within the passage 4, the said holder being provided with an interior passage 11 communicating with the interior of the casing 8 and adapted to be also placed in communication with the interior of the passage 4 upon the lifting of the valve 12 by the air pressure when the operation of the pump is discontinued to permit the liquid to flow out of the flexible hose 3 down to the level of the outlet passage 4.

It will be apparent that, unless the pipe 2 is filled to the level 14 of the outlet passage 4, the full quantity pumped will not be delivered through the hose 3, for some liquid will remain to fill the formerly unfilled parts of the pipe 2 and casing 5 to the level 14 of the outlet passage when the operation of the pump has been stopped and the liquid above the level of the outlet 4 drained out by admission of air through the air-vent 7. When the pipe 2 and the casing 5 are filled to the level 14 the pump is said to be primed.

To ascertain whether or not the pump is primed, at least one transparent section is provided in the discharge passage as indicated at 15. As shown, this section consists of a circular glass 15 set into a cylindrical enlargement of the casing 5 and held thereto by a ring 16, suitable gaskets, or their equivalents, being provided to prevent leakage. Preferably there are two transparent sections 15 located at the opposite ends of the cylindrical portion of the casing 5.

While indications, as to whether or not the pump is primed, can be had by reason of the transparent sections 15, I prefer to provide another device in conjunction therewith to more clearly indicate the position of the liquid. This device comprises a float 18, which, when the pump is not primed, may approach or lie below the glass 15. As the liquid rises in the pipe 2 and casing 5, the float 18 rises and becomes visible through the glass.

The float 18 may be advantageously supported and guided in the following manner. A rod 19, suitably affixed to the upper end of casing 5, or, by preference, to a removable plug 20 therein extends downwardly through the casing and, if necessary, into pipe 2. Float 18 encompasses rod 19 and is freely slidable thereon, being prevented from dropping off the lower end of the rod by the restricted opening in the upper end of the pipe 2, and being limited in its upward movement by a stop 21 carried by the rod.

The float 18 preferably has a line 22 thereon which is so positioned as to be in line with the level 14 of the outlet when the float is in contact with the stop 21 carried by the rod 19. The float may likewise be painted in contrasting colors, as, for example, red below line 22 and white above, and a line 23 may be etched or painted on one or both of the transparent sections in the horizontal plane of the level 14 whereby the consumer may be immediately apprised as to whether the liquid is at the required level in the casing before the pumping operation is commenced.

In order to apprise the customer with certainty whether or not the pump is properly primed it is desirable that the stop 21 be so positioned that the line 22 on the float will coincide with the level 14 of the outlet. Thus, when the float occupies its uppermost position, the pump is properly primed and any downward movement of the float 18 below its uppermost position indicates that the level of the liquid has fallen below the level of the outlet. The provision of the etched or painted lines on the transparent section provides convenient means for quickly and certainly estimating the depression of liquid in the pipe below the level of the outlet.

As an additional indicating means for apprising the customer of the efficiency of the apparatus and the continued and proper operation of the same, a vane wheel 24 is provided which is rotatably mounted in a bearing 25 slidable upon the rod 19. The vane wheel 24 is preferably located beneath the float 18 and, as the bearing 25 in which the same is rotatably mounted is slidable upon the rod, a normal flow of liquid upwardly through the pipe 2 will strike the radiating vanes 26 of the vane wheel and cause rotation of the same, at the same time causing the vane wheel to slide upwardly along the rod 19 until its upward movement is stopped by its contact with the float 18 when the float engages the stop 21.

The vane wheel will however continue to rotate after its upward movement is stopped by the float so long as the liquid continues to flow uninterruptedly and in normal volume through the pipe 2. Any secession or diminution of this normal flow is immediately indicated by the vane wheel rotating at a slower speed or starting to fall when the flow is diminished to a sufficient extent to be unable to support the wheel in its uppermost position. By giving the vanes proper inclination and suitable surface the wheel may be adapted for use in connection with pumps having different normal flow and varying degrees of the diminution of flow may be quickly and accurately indicated.

While the invention has been disclosed herein in an embodiment which is at present preferred, it is to be understood that the invention is not limited to the precise details of construction shown and described except as such limitations may be included in the following claims.

What I claim is—

1. In a liquid dispensing apparatus, the combination of a discharge passage for liquid, of a transparent portion forming part of the wall of said passage, a vertical guide rod located in said passage, a bearing slidable on said guide rod, and a vane-wheel rotatable under the influence of liquid flowing through said passage whereby the bearing is moved along the guide rod.

2. In a liquid dispensing apparatus, the combination with a discharge passage for liquid, of a transparent portion forming part of the wall of said passage, means for indicating the flow of liquid through said passage, and a float for indicating the level of the liquid therein and for locating the flow indicating means relatively to said transparent portion while liquid is flowing through said passage.

3. In a liquid dispensing apparatus, the combination with a discharge passage for liquid, of a transparent portion forming part of the wall of said passage, a vane-wheel for indicating the flow of liquid through said passage, and a float for indicating the level of the liquid therein and for maintaining the vane-wheel submerged in the liquid when the latter is flowing through the transparent wall portion of said passage.

4. In a liquid dispensing apparatus, the combination of a discharge passage for liquid, a transparent portion forming part of the wall of said passage, a guide member located in said passage, a vertically movable vane-wheel guided by said guide member and movable in said passage to indicate the flow of liquid therethrough, and a float guided by said guide member for indicating the level of the liquid in said passage, said float being constructed and arranged to limit the upward movement of said vane wheel.

5. In a liquid dispensing apparatus, the combination with a discharge passage provided with an outlet, of a transparent portion forming part of the wall of said passage and located opposite the level of said outlet, a vertical guide rod located in said passage, a vane wheel rotatable on said guide rod under the influence of liquid flowing through said passage, said vane wheel being normally located below said trasparent portion and being adapted for upward movement on said rod as said wheel rotates, a float vertically movable upon said rod above said wheel for indicating the level of the liquid, said float being constructed and arranged to limit the upward movement of said vane wheel.

6. In a liquid dispensing apparatus, the combination with a discharge passage provided with an outlet, of a transparent portion forming part of the wall of said passage and located opposite the level of said outlet, a vertical guide rod located in said passage, a vane wheel rotatable on said guide rod under the influence of liquid flowing through said passage, said vane wheel being normally located below said transparent portion and being adapted for upward movement on said rod as said wheel rotates, a float vertically movable upon said rod above said wheel and having a mark thereon to indicate fall of the liquid below the level of the outlet, said float being constructed and arranged to limit the upward movement of said vane wheel.

7. In a liquid dispensing apparatus, the combination with a discharge passage provided with an outlet, of a transparent portion forming part of the wall of said passage and located opposite the level of said outlet, a vertical guide rod located in said passage, a vane wheel rotatable on said guide rod under the influence of liquid flowing through said passage, said vane wheel being normally located below said transparent portion and being adapted for upward movement on said rod as said wheel rotates, a float vertically movable upon said rod above said wheel and having a mark thereon to indicate fall of the liquid below the level of the outlet, said float being constructed and arranged to limit the upward movement of said vane wheel, and means on said guide rod for limiting the upward movement of the float.

In testimony whereof I have affixed my signature.

JOHN B. DAVIS.